US007511660B2

(12) United States Patent
Damidaux et al.

(10) Patent No.: US 7,511,660 B2
(45) Date of Patent: Mar. 31, 2009

(54) DEVICE FOR GENERATION OF INTEGRITY MESSAGES SIGNALING NOMINAL, DEGRADED OR INACTIVE SURVEILLANCE STATIONS OF SATELLITE NAVIGATION SYSTEMS

(75) Inventors: Jean-Louis Damidaux, Auzielle (FR); Mathias Van-Den-Bossche, Goyrans (FR); Jean Christophe Levy, Balma (FR)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 11/773,769

(22) Filed: Jul. 5, 2007

(65) Prior Publication Data
US 2008/0007452 A1   Jan. 10, 2008

(30) Foreign Application Priority Data
Jul. 5, 2006   (FR) .................................. 06 52804

(51) Int. Cl.
*G01S 1/02* (2006.01)
*G01S 5/00* (2006.01)
(52) U.S. Cl. .............................. 342/357.02; 342/357.07
(58) Field of Classification Search ................. 342/352, 342/357.01, 357.02, 357.06, 357.07; 701/213, 701/215; 455/12.1, 13.1
See application file for complete search history.

(56) References Cited

U.S. PATENT DOCUMENTS 7,383,124 B1 * 6/2008 Vesel .......................... 701/200
2007/0040734 A1 * 2/2007 Evers et al. .................. 342/126
2007/0252760 A1 * 11/2007 Smith et al. .................. 342/451

FOREIGN PATENT DOCUMENTS

WO   WO 95/18977 A1   7/1995

OTHER PUBLICATIONS

Oehler V., et al.: "The Galileo Integrity Concept," ION GNSS. International Technical Meeting of the Satellite Division of the Institute of Navigation, Washington, DC, US, Sep. 21, 2004, pp. 604-615, XP002375520.
Franko, R. E., et al.: "A New Generation of DGPS Broadcasting Stations," Proceedings of ION GPS-98, Sep. 15, 1998, pp. 1271-1283, Nashville, TN, USA, XP002416561.

* cited by examiner

*Primary Examiner*—Dao L Phan
(74) *Attorney, Agent, or Firm*—Fay Sharpe LLP

(57) ABSTRACT

A device dedicated to generating integrity messages relating to at least one satellite navigation system including a set of satellite surveillance stations and to be sent to navigation receivers. The device includes a processor responsible for determining at chosen times the stations that are active (i.e. nominal or degraded) for each system concerned and, after each such determination, for generating an integrity message including at least primary data representative of the active (i.e. nominal or degraded) stations. The processor is also responsible, each time it detects that at least one station has become degraded or inactive between two successive chosen times, for generating an integrity alert message including at least primary data representative of each station that has become degraded or inactive. Thus, each receiver can determine integrity information relating to the navigation messages that it has received from the satellite navigation system to which it is tuned, given the stations of the system that are actually active (i.e. nominal or degraded) and one or more corresponding integrity degradation rules.

12 Claims, 1 Drawing Sheet

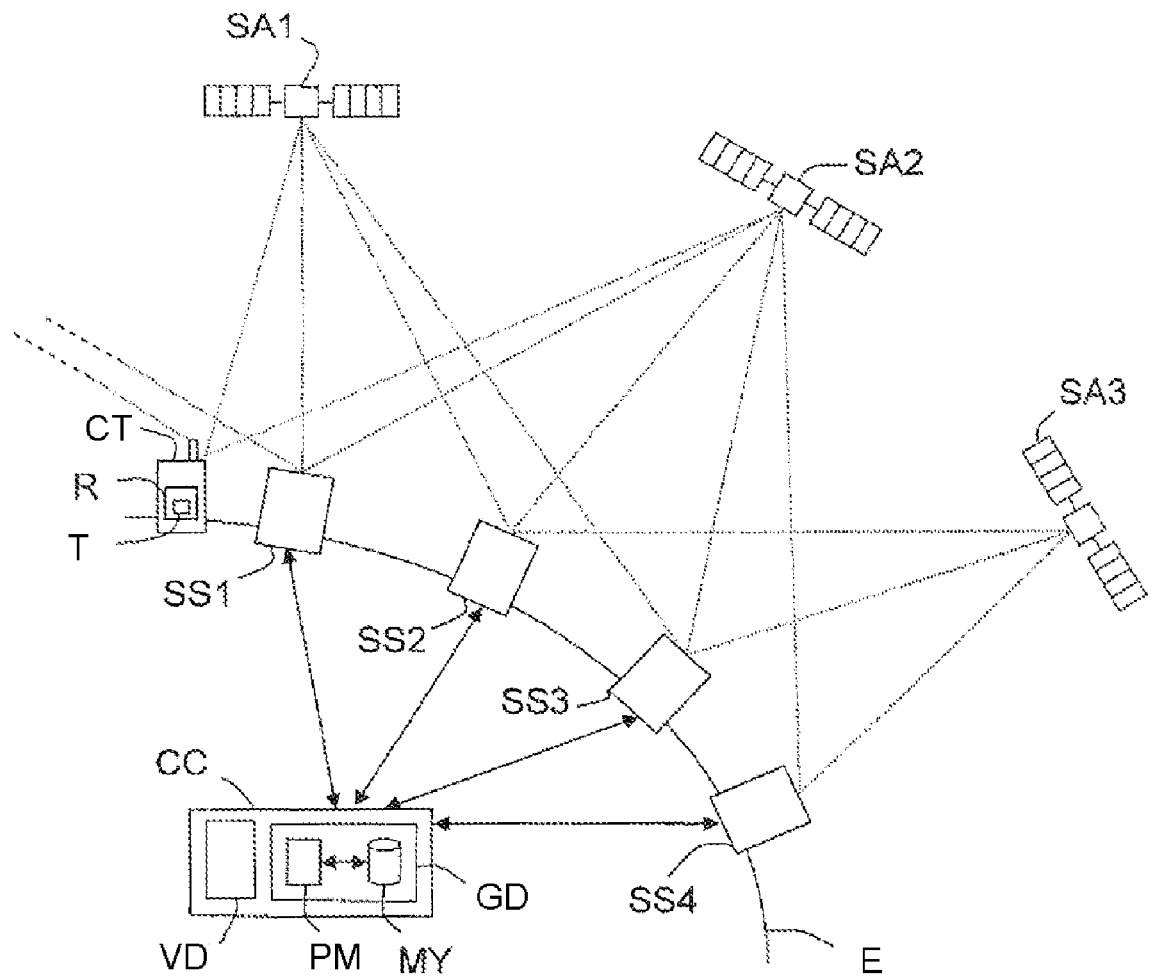
Single figure

DEVICE FOR GENERATION OF INTEGRITY MESSAGES SIGNALING NOMINAL, DEGRADED OR INACTIVE SURVEILLANCE STATIONS OF SATELLITE NAVIGATION SYSTEMS

CROSS-REFERENCE TO RELATED APPLICATIONS

This application is based on French Patent Application No. FR 0652804 filed Jul. 5, 2006, the disclosure of which is hereby incorporated by reference thereto in its entirety, and the priority of which is hereby claimed under 35 U.S.C. §119.

BACKGROUND OF THE INVENTION

1. Field of the Invention

The invention concerns satellite navigation systems (of RNSS (Radio Navigation Satellite System) or GNSS (Global Navigation Satellite System) type), and more precisely the generation of integrity messages that are transmitted to their navigation receivers, in addition to navigation messages.

Here "satellite navigation system" means any system dedicated to navigation and including a constellation of satellites placed in orbit around a heavenly body (for example the Earth), a set of (terrestrial or spatial) satellite surveillance stations, and a computer center. It could be one of the existing systems (GPS, EGNOS, WAAS), for example, or one of the planned systems (GALILEO, COMPASS), or one of their equivalents or derivatives.

Moreover, here "navigation message" means a message that is broadcast to navigation receivers of users of a satellite navigation system and includes navigation information relating to its orbital position and/or its synchronization (offset of its internal clock relative to the reference clock of the system).

Furthermore, hereinafter "integrity information" means data representative of the reliability values of information on the position and/or the offsets of the clocks of the satellites, used to produce user position and/or clock information, and contained in a navigation message.

2. Description of the Prior Art

As the person skilled in the art knows, the quality of the surveillance of the integrity of the users of the navigation receivers has an impact on the confidence that a user can have in the position that his (navigation) receiver has determined. That surveillance quality depends essentially on the integrity surveillance conditions, i.e. the combination of the number of active (i.e. nominal or degraded) surveillance stations therefore capable of surveillance of each satellite, errors in pseudo-distance measurements effected by those surveillance stations, the geometrical distribution (positions) of the surveillance stations vis à vis the satellite(s), and the algorithms used to effect this surveillance. Failure of at least one surveillance station or a transmission problem will therefore degrade integrity surveillance performance and it is crucial to inform users of them as quickly as possible.

In current navigation systems (with integrity), an integrity surveillance quality indicator (ISQI) is broadcast in an integrity message sent to the navigation receivers for each satellite under surveillance by the integrity surveillance "segment" of the system. In the case of the EGNOS or WAAS system, for example, the ISQI is called the User Differential Range Error (UDRE), and in the case of the GALILEO system the ISQI is called the Signal In Space Monitoring Accuracy (SISMA).

It being beneficial for a navigation receiver to use as many satellites as possible to enhance the estimate of its position, it is therefore important for it to have the greatest possible number of ISQI. Now, not only is the number of navigation satellite constellations increasing, but also the number of satellites per constellation is tending to increase (the standard GPS constellation is defined for 24 satellites but in fact comprises 27 or 28 satellites, and GALILEO could include up to 36 satellites). Consequently, the standard integrity messages are going to tend to comprise an ever higher number of ISQI. This trend runs the risk of becoming further accentuated if the same "network" of surveillance stations is used for several different constellations of navigation satellites (for example, an integrity surveillance segment common to the GPS, GLONASS and GALILEO constellations would have to manage more than 90 satellites.).

In the case of failure of a portion of the integrity surveillance segment, it is necessary to inform users of the modifications of the integrity surveillance capacity with respect to several tens of satellites, by sending as many ISQI as there are satellites concerned. This gives rise to a real problem because of the limited bandwidth dedicated to the navigation signals (for example, the set of SBAS (Satellite Based Augmentation System) type messages can manage only 51 satellites in a static manner, the set of messages planned for the GALILEO system can manage only 36 satellites in a static manner, and dynamic management, necessitating identification of each satellite (7 bits for 90 satellites), offers even lower capacity). The mechanism for alerting users by way of the standard integrity messages therefore proves to be poorly adapted or even not adapted at all to situations in which the number of satellites under surveillance by the integrity surveillance segment is high, typically greater than fifty.

An object of the invention is therefore to improve upon this situation.

SUMMARY OF THE INVENTION

To this end the invention proposes a device for generating integrity messages relating to at least one satellite navigation system including a set of satellite surveillance stations and to be sent to navigation receivers, comprising processor means responsible for determining at chosen times the (satellite surveillance) stations that are active (i.e. nominal or degraded) for each system concerned and, after each such determination, for generating an integrity message including at least primary data representative of the active (i.e. nominal or degraded) satellite surveillance stations. The processor means are also responsible, each time they detect that at least one station has become inactive or has passed from a nominal state to a degraded state between two successive chosen times, for generating an integrity alert message including at least primary data representative of each (satellite surveillance) station that has become inactive or degraded. Thus each (navigation) receiver can determine integrity information relating to the navigation messages that it has received from the satellite navigation system to which it is tuned, given the stations of the system that are actually active (i.e. nominal or degraded) and one or more corresponding integrity degradation rules.

The mode of operation defined above can be associated with the standard mode of operation as a function of the advantage obtained in terms of bandwidth use.

It will be noted that the integrity messages and the integrity alert messages of the invention are different from those usually employed that contain integrity data (or ISQI) representative of the reliability values of the orbital position error and/or satellite synchronization corrections. Consequently, the invention concerns only navigation receivers that are themselves capable of determining the integrity data (ISQI)

that is representative of the reliability values of the position and/or clock offset information for the satellites that are used to produce the user position and/or clock information that they receive. The navigation receivers that the invention concerns must therefore include an integrity data (e.g. ISQI) computation tool.

The device of the invention may have other features and in particular, separately or in combination:
- the primary data can be, for example, representative of the position coordinates of the stations, or identifiers of the stations (whose respective position coordinates are known to said navigation receivers) and where appropriate station position coordinate corrections;
- its processor means can be responsible for integrating into an integrity alert message secondary data representative of degraded measurement quality in a station that has become degraded or inactive;
- its processor means can be responsible for integrating into an integrity message secondary data representative of quality levels of the information supplied by the surveillance stations that are active (i.e. nominal or degraded) or algorithms responsible for correcting this information in the mission segment;
- the secondary data can, for example, consist of identifiers of quality charts (or graphs) for the information supplied by the active (i.e. nominal or degraded) surveillance stations and/or identifiers of algorithms used by the mission segment to correct this information;
- its processor means can be responsible for integrating into an integrity message secondary data representative of surveillance and/or accuracy information determined for each satellite from data supplied by the active (i.e. nominal or degraded) stations;
- its processor means can be responsible for integrating into an integrity alert message secondary data representative of integrity degradation rules to be used for each satellite surveillance station that has become degraded or inactive; for example, the secondary data consists of identifiers of one or more integrity degradation rules that must be used for a given station that has become degraded;
- its processor means can be responsible for generating integrity messages periodically; in this case, the time difference between two chosen times is equal to the integrity message generation period.

The invention is particularly well adapted, although not exclusively so, to the integrity services of satellite navigation systems such as GALILEO, GPS, EGNOS, WAAS and COMPASS, for example, and their variants and equivalents.

BRIEF DESCRIPTION OF THE DRAWING

Other features and advantages of the invention will become apparent on reading the following detailed description and examining the appended drawing, in which the single FIGURE is a highly schematic and functional illustration of a portion of a satellite navigation system comprising a computation station equipped with one embodiment of an integrity message generation device of the invention.

The appended drawing constitutes part of the description of the invention as well as contributing to the definition of the invention, if necessary.

DETAILED DESCRIPTION OF THE PREFERRED EMBODIMENT

An object of the invention is to advise navigation receivers of the integrity surveillance capacities of the (ground or satellite) integrity surveillance segment of at least one satellite navigation system so that they can themselves determine integrity data representative of the values of reliability of satellite orbital position and/or synchronization error corrections, used to produce navigation information contained in navigation messages broadcast by said satellites.

The case of a single satellite navigation system is considered hereinafter by way of nonlimiting example. However, the invention is not limited to a single satellite navigation system. More precisely, it concerns (ground or satellite) integrity surveillance of at least one constellation of navigation satellites of at least one satellite navigation system, and for example two or three, or even more.

Moreover, the satellite navigation system considered is the planned GALILEO system. However, the invention is not limited to that system. In fact it concerns all satellite navigation systems using personal or shared (ground or satellite) integrity surveillance (or consistency verification), and in particular existing systems of GPS (in particular GPS III), EGNOS and WAAS type, and the planned COMPASS system, as well as all their equivalents and derivatives.

A satellite navigation system, for example that partially illustrated in the single figure, comprises at least one constellation of satellites $SA_i$ (here i=1 to 3, but in reality its maximum value is much higher, typically 36 in the case of the GALILEO system), a set of (terrestrial or space) surveillance stations $SS_j$ (here j=1 to 4, but in reality its maximum value is much higher, typically 40 to 100 in the case of the GALILEO system), and a computer center CC.

Broadly speaking, the satellites $SA_i$ are placed in orbit around the Earth E and are responsible, in particular, for sending signals for effecting pseudo-distance measurements and for broadcasting in the direction of the Earth E navigation messages that are transmitted to them by the mission ground segment, in order for the information that they contain to be used by navigation receivers R, possibly installed in communication terminals CT (as shown), and by the surveillance stations $SS_j$.

It will be noted that a (navigation) receiver R can itself constitute a communication equipment. Moreover, a (navigation) receiver R can be installed in any type of communication terminal (or equipment) CT, and in particular in a mobile (or cellular) telephone, a portable or onboard computer, or a personal digital assistant (PDA).

It will also be noted that the invention concerns only (navigation) receivers R that include a tool for computing integrity data, for example an ISQI.

The surveillance stations $SS_j$ are situated at chosen locations on the Earth E (as shown) or in spacecraft, for example satellites. They are responsible in particular, on the one hand, for collecting navigation messages broadcast by the satellites $SA_i$ of the constellation and, on the other hand, periodically to effect measurements of the pseudo-distances between them and the satellites $SA_i$ in view. Each pseudo-distance measurement and the corresponding navigation message as well as its time of reception are communicated by each surveillance station $SS_j$ to the computer center CC.

The computer center CC is generally—although not necessarily—installed on the Earth E. It comprises a consistency verification device VD responsible in particular for controlling the consistency of the received pseudo-distance measurements and the information contained in the navigation messages broadcast by the satellites $SA_i$, which are communicated to it by the surveillance stations $SS_j$. The computer center CC can also be responsible for predicting the trajectories and clock offsets of the satellites $SA_i$ from the pseudo-distance measurements effected by the (surveillance)

stations SSj. These trajectory and clock offset predictions are used to generate future navigation messages that are transmitted to the satellites SAi in order for the latter to broadcast them.

The invention proposes to add an integrity message generation device GD to the integrity surveillance segment (which comprises the stations SSj and the consistency verification device VD). As shown in the single figure, this integrity message generation device GD can be part of the computer center CC. This is not obligatory, however, what is important being that it can communicate with the consistency verification device VD.

The integrity message generation device GD is responsible for generating integrity messages of a new type relating to the constellation of satellites SAi of the satellite navigation system, to be sent to the receivers R. To this end it comprises a processor module PM that is firstly responsible for determining at chosen times the (satellite surveillance) stations SSj that are active (i.e. nominal or degraded) for each system concerned.

Here "active station" means a station SSj capable of surveillance of the satellites SAi in view and thus of transmitting to the computer center CC (nominal or degraded) pseudo-distance measurements and the corresponding navigation messages. An active station is referred to herein either as a nominal station if it is transmitting nominal pseudo-distance measurements or a degraded station if it is transmitting degraded pseudo-distance measurements (which are therefore different from the nominal measurements). Consequently, here "inactive station" means a station SSj incapable of surveillance of the satellites SAi in view and/or of transmitting to the computer center CC pseudo-distance measurements and the corresponding navigation messages, because environmental conditions prevent the collection of information, because of an internal fault or because of a transmission problem on the path between it and the computer center CC.

For example, this determination is effected periodically, with a chosen period of one (1) second. The chosen period defines the time difference between two successive chosen times, which itself depends on the response constraints imposed on the surveillance system for the detection of problems at the satellite level.

All the stations SSj that are active (i.e. nominal or degraded) at a given time constitute the configuration of the integrity surveillance "network", which consists (here on the ground, although this is not obligatory) of all the active and inactive stations SSj.

Following each determination of the set consisting of all the active (i.e. nominal or degraded) stations SSj, the processor module PM of the integrity message generation device GD generates an integrity message that includes at least primary data representative of the active (i.e. nominal or degraded) stations SSj of that set.

The active (i.e. nominal or degraded) stations SSj can be represented in any form. For example, the primary data can be representative of the identifiers of the stations SSj. This is well suited to situations in which the stations SSj are installed at fixed locations on the Earth E. In fact, the position coordinates of the stations, necessary for the receivers R to determine the integrity data by means of their computation tool T, evolve very little over time, and so can be known in advance to the receivers R. In this case, if a receiver R receives an integrity message containing a station identifier SSj, it looks up the position coordinates that correspond to it in a table.

In a first variant, the primary data can be representative of the position coordinates of the stations SSj, especially if the latter are not known to the receivers R.

In a second variant, the primary data can be representative of a station identifier SSj and one or more corrections to the position coordinates of that station SSj. This also necessitates the receivers R to contain a table in which the station identifiers are stored in corresponding relationship to their "usual" (i.e. known in advance) position coordinates. In this case, if a receiver R receives an integrity message containing a station identifier SSj and an associated position coordinates correction, it looks up the corresponding position coordinates in a table and corrects the latter as a function of the correction received, before its computation tool T uses them.

For example, the device D includes storage means MY, such as a memory or a database, in which it stores each table of correspondences, and where appropriate the current configuration of the integrity surveillance network.

It will be noted that the processor module PM of the integrity message generation device GD can integrate into at least some of the integrity messages other data that is useful to the computation tool T of a receiver R for determining the integrity data.

For example, it can integrate into an integrity message (or even each such message) secondary data representative of the levels of quality of the information supplied by the surveillance stations. This may be the level of accuracy of the measurements, for example, which are subject to errors caused by the environment of the station and/or the measurement instrumentation and/or the algorithms used to prepare this data within the consistency verification device VD, or in any other manner that characterizes the quality of the measurements.

Alternatively, the secondary data can be representative of identifiers of the measurement error charts (or graphs) mentioned hereinabove. In this case, the graphs or charts must be known in advance by the receivers R. Accordingly, if a receiver R receives an integrity message containing a graph or chart identifier, it looks up the corresponding graph(s) or chart(s) in a table. The receiver R deduces from the level of quality of the measurements represented by the identified chart the contribution of each station to the ISQI of each satellite.

In another variant, or additionally, the processor module PM can integrate into an integrity message secondary data representative of surveillance information (for example an integrity "flag") and/or accuracy information (for example a measurement error chart) determined for each satellite by the computer center CC from data supplied by the active (i.e. nominal or degraded) stations SSj and therefore given the (active) configuration of the integrity surveillance network.

Each integrity message is broadcast to the receivers R in order for each of them to determine, by means of their computation tool T, integrity information relating to the navigation messages received from the satellite navigation system to which it is tuned, given the active (i.e. nominal or degraded) stations SSj designated in the integrity message that define the (active) configuration of the integrity surveillance network.

The integrity messages can be broadcast by any means known to the person skilled in the art, and in particular via the satellites SAi of the constellation (as for example in the case of a GALILEO type system—Medium Earth Orbit (MEO) broadcast mode) or by one or more geosynchronous satellites (Geosynchronous Earth Orbit (GEO) broadcast mode, for example in the case of the integrity layer added to a GPS or GLONASS type system via regional satellite augmentations such as EGNOS or WASS), or terrestrial telecommunication networks as in LBS (Location Based Services) type applications.

The integrity information that is computed by a computation tool T depends on the satellite navigation system for which its receiver R is tuned. It is a question of at least one integrity surveillance quality indicator (ISQI) specific to each satellite. For example, in the case of the EGNOS or WAAS system, the ISQI is the UDRE (User Differential Range Error) and in the case of the GALILEO system, the ISQI is the SISMA (Signal In Space Monitoring Accuracy). The ISQI serves to translate the surveillance quality of the navigation information supplied by each satellite into a potential error level in respect of the user-estimated position solution.

Moreover, each time that the processor module PM determines that at least one station SSj has just become degraded or inactive between two successive chosen times, it generates an integrity alert message that includes at least primary data representative of each station SSj that has become degraded or inactive.

This primary data is of the same type as that which is integrated into an integrity message (of the invention) described hereinabove. It is therefore, for example, a question of data representative of the position coordinates of another station SSj that has become degraded or inactive or the identifier of a station SSj that has become degraded or inactive.

It will be noted that the processor module PM of the integrity message generation device GD can integrate into at least some of the integrity alert messages other data useful to the computation tool T of a receiver R for determining the integrity data.

For example, it can integrate into an integrity alert message (or even each such message) secondary data representative of the degraded quality of the information (it may be a question, for example, of the level of accuracy of the measurements, which are subject to errors caused by the environment of the station and/or the measuring instrumentation and/or the algorithms used to prepare this data in the consistency verification device VD, or any other way of characterizing the quality of the measurements) in a station SSj that has become degraded or inactive in order to update the data used by the receiver to compute the ISQI of the satellites visible from that station SSj. For example, this secondary data consists of identifiers of measurement error chart(s) (or graph(s)) to be used for a station SSj that has become degraded or inactive. Accordingly, if a receiver R receives an integrity message containing a graph or chart identifier, it looks up the corresponding graph(s) or chart(s) in a table.

Alternatively, or in addition to the above, secondary data can be representative of integrity degradation rule(s) to be used by a computation tool T to take into account a station SSj that has become degraded or inactive. The definitions of the rules can be transmitted in the integrity alert messages. However, this can prove costly in terms of the number of bits required. Consequently, it is preferable for the secondary data to consists of identifiers of the integrity degradation rules to be used. However, this requires the receivers R to have available a table in which the rule identifiers are stored in corresponding relationship to their definitions. In this case, if a receiver R receives an integrity alert message containing a rule identifier, it looks up the corresponding rule or rules in a table, and then communicates each rule definition to its computation tool T in order for the latter to use it.

For example, an integrity degradation rule can be of the type "use the station" or "do not use the station" or "downgrade the quality of the measurements from the station by a coefficient X".

It will be noted that the receiver R can be adapted to determine for itself the rule(s) to be applied if a station SSj has become degraded or inactive. In this case, it needs to receive only first data representative of the station SSj that has become degraded or inactive in order to apply to it (or to use) the corresponding rule(s).

These integrity degradation rules are necessary to the computation tool T of each receiver R for determining the integrity information relating to the navigation messages received from the satellite navigation system, given the stations SSj that are actually active (i.e. nominal or degraded). The algorithm to be implemented in the computation tool T must be coherent with, if not derived from, the integrity verification method used by the consistency verification device VD.

The integrity message generation device GD of the invention, and in particular its processor module PM and its storage means MY, if any, can be produced in the form of electronic circuits, software (or electronic data processing) modules, or a combination of circuits and software.

The invention offers a number of advantages, including:
  it transmits to the navigation receivers, for example periodically, only the active (i.e. nominal or degraded) configuration of the integrity surveillance network, and not the ISQI of each of the stations; furthermore, in the case of a failure it signals to the navigation receivers only the station(s) that has or have become degraded or inactive,
  it provides surveillance of a large number of navigation satellites, typically more than 90,
  it takes simultaneously into account a plurality of levels of surveillance, for example single-frequency surveillance and two-frequency surveillance,
  it broadcasts simultaneously alerts relating to the satellites (ISQI) and to the integrity surveillance segment (the primary data and secondary data described hereinabove) to optimize the resulting occupancy of the bandwidth.

The invention is not limited to the integrity message generation device embodiments described hereinabove by way of example only, but encompasses all variants that the person skilled in the art might envisage within the scope of the following claims.

The invention claimed is:

1. A device for generating integrity messages relating to at least one satellite navigation system including a set of satellite surveillance stations and to be sent to navigation receivers, which device comprises processor means adapted to determine at chosen times the satellite surveillance stations that are active, i.e. nominal or degraded, for each system and, after each such determination, to generate an integrity message including at least primary data representative of said active satellite surveillance stations and, in the case of detection between two successive chosen times of at least one satellite surveillance station that has become degraded or inactive, to generate an integrity alert message including at least primary data representative of each satellite surveillance station that has become degraded or inactive, so that each receiver can determine integrity information relating to navigation messages transmitted by a satellite navigation system to which the receiver is tuned, given the satellite surveillance stations of said system that are actually active and corresponding integrity degradation rules.

2. The device according to claim 1, wherein said primary data is representative of the position coordinates of the satellite surveillance stations.

3. The device according to claim 1, wherein said primary data is representative of identifiers of the satellite surveillance stations whose position coordinates are known to said navigation receivers.

4. The device according to claim 3, wherein said primary data is also representative of satellite surveillance station position coordinate corrections.

5. The device according to claim 1, wherein said processor means are adapted to integrate into an integrity alert message secondary data representative of degraded measurement quality in a satellite surveillance station that has become degraded or inactive.

6. The device according to claim 1 wherein said processor means are adapted to integrate into an integrity message secondary data representative of measurement error levels of said satellite surveillance stations that are active, i.e. nominal or degraded.

7. The device according to claim 5, wherein said secondary data consists of identifiers of quality charts for the information supplied by said active surveillance stations and/or identifiers of algorithms used in a mission segment to correct said information supplied by said active surveillance stations.

8. The device according to claim 1, wherein said processor means are adapted to integrate into an integrity message secondary data representative of surveillance and/or accuracy information determined for each satellite from data supplied by said active, i.e. nominal or degraded, satellite surveillance stations.

9. The device according to claim 1, wherein said processor means are adapted to integrate into an integrity alert message secondary data representative of integrity degradation rules to be used for each satellite surveillance station that has become degraded or inactive.

10. The device according to claim 9, characterized in that said secondary data consists of identifiers of integrity degradation rules to be used for a satellite surveillance station that has become degraded or inactive, said integrity degradation rules being known to said navigation receivers.

11. The device according to claim 1, wherein said processor means are adapted to generate integrity messages periodically, the time difference between two chosen times then being equal to the integrity message generation period.

12. The use of the integrity message generation device according to claim 11 for the integrity services of satellite navigation systems chosen in a group comprising at least GALILEO, GPS, EGNOS, WAAS and COMPASS, as well as their variants and equivalents.

* * * * *